US009242509B2

(12) United States Patent
Chang

(10) Patent No.: US 9,242,509 B2
(45) Date of Patent: Jan. 26, 2016

(54) NON PNEUMATIC VEHICLE TIRES AND PNEUMATIC VEHICLE TIRES WITH TREAD PATTERNS

(71) Applicant: Alice Chang, South Pasadena, CA (US)

(72) Inventor: Alice Chang, South Pasadena, CA (US)

( * ) Notice: Subject to any disclaimer, the term of this patent is extended or adjusted under 35 U.S.C. 154(b) by 274 days.

(21) Appl. No.: 13/956,283

(22) Filed: Jul. 31, 2013

(65) Prior Publication Data
US 2014/0217808 A1 Aug. 7, 2014

Related U.S. Application Data

(60) Provisional application No. 61/761,984, filed on Feb. 7, 2013.

(51) Int. Cl.
B60C 7/12 (2006.01)
B60C 7/10 (2006.01)
B60B 3/00 (2006.01)

(52) U.S. Cl.
CPC .... B60C 7/10 (2013.01); B60B 3/00 (2013.01)

(58) Field of Classification Search
CPC .................................. B60C 7/12; B60C 7/125
USPC .................................. 152/246, 323, 329, 301
See application file for complete search history.

(56) References Cited

U.S. PATENT DOCUMENTS 2,620,844 A * 12/1952 Lord ............................. 152/326
3,901,300 A 8/1975 Toplis et al.
4,784,201 A 11/1988 Palinkas et al.
4,832,098 A * 5/1989 Palinkas et al. ................ 152/7
4,934,425 A * 6/1990 Gajewski et al. ............. 152/323
4,945,962 A * 8/1990 Pajtas ............................. 152/7
5,042,544 A * 8/1991 Dehasse ....................... 152/302
5,265,659 A * 11/1993 Pajtas et al. .................. 152/329
5,343,916 A 9/1994 Duddey et al.
5,460,213 A * 10/1995 Pajtas ............................ 152/11
6,988,521 B2 1/2006 Chen
8,104,524 B2 * 1/2012 Manesh et al. ............... 152/326
8,113,253 B2 * 2/2012 Arakawa et al. ............. 152/246
8,176,957 B2 * 5/2012 Manesh et al. ............... 152/326
8,555,941 B2 * 10/2013 Perron et al. ................. 152/326
D711,815 S * 8/2014 Abe et al. ..................... D12/605
8,813,797 B2 * 8/2014 Anderson et al. .............. 152/41
8,851,131 B2 * 10/2014 Luchini et al. ............... 152/324
D727,247 S * 4/2015 Martin et al. ................ D12/570
D731,962 S * 6/2015 Martin et al. ................ D12/605
2005/0133133 A1 * 6/2005 Becker et al. ................ 152/323
2009/0283185 A1 * 11/2009 Manesh et al. ................. 152/11
2010/0084910 A1 4/2010 Botes et al.
2010/0108215 A1 * 5/2010 Palinkas et al. .............. 152/324
2010/0132865 A1 * 6/2010 Iwase et al. .................. 152/301
2010/0200131 A1 * 8/2010 Iwase et al. ................ 152/209.1
2010/0314014 A1 * 12/2010 Burns .......................... 152/301
2011/0011506 A1 * 1/2011 Manesh et al. ............... 152/328
2011/0024008 A1 * 2/2011 Manesh et al. .................. 152/5
2011/0079335 A1 * 4/2011 Manesh et al. ............... 152/310
2011/0240193 A1 * 10/2011 Matsuda et al. .............. 152/246
2011/0248554 A1 * 10/2011 Chon et al. ............... 301/63.102

(Continued)

Primary Examiner — Jeffrey J Restifo
(74) Attorney, Agent, or Firm — RG Patent Consulting, LLC; Rachel Gilboy

(57) ABSTRACT

Vehicle tires with solid materials, such as rubber and polymer, are designed to increase the safety of the vehicle without the risk of having a flat tire. The tires are non pneumatic and have treads. The tires are for use on a variety of vehicles, including cars, bicycles, motorcycles, scooters, trucks, buses, aircrafts, earthmovers, tractors, trailers, carts, heavy equipments, and lawnmowers.

16 Claims, 3 Drawing Sheets

(56) References Cited

U.S. PATENT DOCUMENTS

| | | | |
|---|---|---|---|
| 2012/0038206 A1* | 2/2012 | Chadwick et al. | 301/37.23 |
| 2012/0038207 A1* | 2/2012 | Williams et al. | 301/37.23 |
| 2012/0060991 A1* | 3/2012 | Mun et al. | 152/323 |
| 2012/0216932 A1* | 8/2012 | Cron et al. | 152/246 |
| 2012/0234444 A1* | 9/2012 | Palinkas et al. | 152/246 |
| 2013/0240272 A1* | 9/2013 | Gass et al. | 180/54.1 |
| 2013/0319591 A1* | 12/2013 | Van De Wiele | 152/246 |
| 2014/0000777 A1* | 1/2014 | Choi et al. | 152/246 |
| 2014/0062170 A1* | 3/2014 | Martin et al. | 301/62 |
| 2014/0062171 A1* | 3/2014 | Martin et al. | 301/62 |
| 2014/0191564 A1* | 7/2014 | Gebeau | 301/37.101 |
| 2014/0217808 A1* | 8/2014 | Chang | 301/63.101 |
| 2014/0238561 A1* | 8/2014 | Choi et al. | 152/17 |
| 2014/0311643 A1* | 10/2014 | Amstutz et al. | 152/310 |
| 2015/0034222 A1* | 2/2015 | Martin et al. | 152/154.2 |
| 2015/0034225 A1* | 2/2015 | Martin | 152/326 |
| 2015/0122382 A1* | 5/2015 | Choi et al. | 152/17 |

* cited by examiner

NON PNEUMATIC VEHICLE TIRES AND PNEUMATIC VEHICLE TIRES WITH TREAD PATTERNS

CROSS-REFERENCE TO RELATED APPLICATION

The present application is related to and claims priority from prior provisional application Ser. No. 61/761,984, filed Feb. 7, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of non-pneumatic tires and more specifically relates to non pneumatic vehicle tires and pneumatic vehicle tires with tread patterns.

2. Description of the Related Art

A tire is traditionally a ring-shaped covering that fits around a wheel's rim to protect it and enable better vehicle performance. Most tires, such as those for automobiles and bicycles, provide traction between the vehicle and the road while providing a flexible cushion that absorbs shock.

The fundamental materials of modern pneumatic tires are synthetic rubber, natural rubber, fabric and wire, along with carbon black and other chemical compounds. They consist of a tread and a body. The tread provides traction while the body provides containment for a quantity of compressed air. Before rubber was developed, the first versions of tires were simply bands of metal that fitted around wooden wheels to prevent wear and tear.

The tread is the part of the tire that comes in contact with the road surface. The portion that is in contact with the road at a given instant in time is the 'contact patch'. The tread is a thick rubber, or rubber/composite compound formulated to provide an appropriate level of traction that does not wear away too quickly. The tread pattern is characterized by the geometrical shape of the grooves, lugs, voids and sipes. Grooves run circumferentially around the tire, and are needed to channel away water. Lugs are that portion of the tread design that contacts the road surface. Voids are spaces between lugs that allow the lugs to flex and evacuate water. Tread patterns feature non-symmetrical or non-uniform lug sizes circumferentially to minimize noise levels at discrete frequencies. Sipes are valleys cut across the tire, usually perpendicular to the grooves, which allow the water from the grooves to escape to the sides in an effort to prevent hydroplaning.

Treads are often designed to meet specific product marketing positions. High performance tires have small void ratios to provide more rubber in contact with the road for higher traction, but may be compounded with softer rubber that provides better traction, but wears quickly. Mud and snow tires are designed with higher void ratios to channel away rain (water) and mud, while providing better gripping performance. Specialized tires will always work better than general/all purpose/all weather tires when being used in the conditions the specialized tires are designed for.

Today, the majority of tires are pneumatic inflatable structures, comprising a doughnut-shaped body of cords and wires encased in rubber and generally filled with compressed air to form an inflatable cushion. Pneumatic tires are used on many types of vehicles, including cars, bicycles, motorcycles, scooters, trucks, buses, aircrafts, earthmovers, tractors, trailers, heavy equipments, carts, and lawnmowers. Metal tires are still used on locomotives and railcars.

Tire production starts with bulk raw materials such as rubber, carbon black, and chemicals and produces numerous specialized components that are assembled and cured. Many kinds of rubber are used, the most common being styrene-butadiene copolymer. The tire is an assembly of numerous components that are built up on a drum and then cured in a press under heat and pressure. Heat facilitates a polymerization reaction that cross-links rubber monomers to create long elastic molecules. These polymers create the elastic quality that permits the tire to be compressed in the area where the tire contacts the road surface and spring back to its original shape under high-frequency cycles. The present tire making process of pneumatic tires has many short-comings. Further, pneumatic tires are prone to rapid wear causing a large environmental footprint. Pneumatic tires may also be dangerous during blowouts and require maintenance on a steady basis. A reliable and safe solution is desirable.

Various attempts have been made to solve the above-mentioned problems such as those found in U.S. Pub. And Pub. Nos. 6,988,521; 3,901,300; 2012/0234444; 2010/0084910; 4,784,201; and 5,343,916. This art is representative of non-pneumatic tires. None of the above inventions and patents, taken either singly or in combination, is seen to describe the invention as claimed.

Ideally, solid rubber vehicle tires should provide safety and convenience and, yet would operate reliably and be manufactured at a modest expense. Thus, a need exists for reliable solid rubber (non-pneumatic) vehicle tires to avoid the above-mentioned problems.

BRIEF SUMMARY OF THE INVENTION

In view of the foregoing disadvantages inherent in the known non-pneumatic tire art, the present invention provides novel solid rubber vehicle tires. The general purpose of the present invention, which will be described subsequently in greater detail is to provide a non pneumatic vehicle tires with solid materials, such as rubber and polymer, so that the safety of the vehicle is enhanced without the risk of having a flat tire. Today, the majority of tires are pneumatic inflatable structures, comprising a doughnut-shaped body of cords and wires encased in rubber and generally filled with compressed air to form an inflatable cushion. By creating non pneumatic vehicle tires, there is no need to inflate the tire with air, and so there is no risk of having a flat tire. Non pneumatic vehicle tires are heavier than the inflatable rubber tires such that the center of gravity of the vehicle is lowered, and it is safer to drive the vehicle. Thus the vehicle will likely have fewer accidents provided proper balancing is maintained. Further, non pneumatic vehicle tires and pneumatic vehicle tires of the present invention are created with a variety of tread patterns, so that it is safer to drive the vehicle despite adverse conditions that may exist. The vehicle(s) may include cars, bicycles, motorcycles, scooters, trucks, buses, aircrafts, earthmovers, tractors, trailers, heavy equipments, carts, lawnmowers, etc.

A non-pneumatic tire system for use with a vehicle is disclosed herein, in a preferred embodiment comprising: a non-pneumatic tire assembly having a non-pneumatic tire having an inner circumference, an outer circumference, treads, ribs (interiorly molded), and a tire-body, a rim having an outer periphery, an inner periphery, and a rim-body; wherein the non-pneumatic tire system for use with a vehicle comprises the non-pneumatic tire assembly, the non-pneumatic tire assembly for use on a vehicle. The non-pneumatic tire assembly comprises in combination the non-pneumatic tire and the rim, the rim removably mountable to the vehicle via the rim-body, the non-pneumatic tire removably mounted about the outer periphery of the rim for use.

The parameters of the tire-body of the non-pneumatic tire are defined by the inner circumference and the outer circumference oriented substantially parallel to a road-engaging surface, the outer circumference providing the road-engaging surface comprising the treads; the treads useful for providing positive grip on a road surface. The tire-body of the non-pneumatic tire comprises a substantially solid cross-section defined vertically via exterior walls substantially perpendicular to the road-engaging surface. The rim-body of the rim is defined by the outer periphery and the inner periphery, wherein the rim-body of the rim comprises fastener receivers for fastening the rim to the vehicle. When desired (for service or maintenance) the rim may be removed from the vehicle and the tire-body removed from the rim.

The tire-body although comprising a substantially solid cross-section comprises an inner volume for holding a cooling medium, the inner volume supported by the ribs, the ribs located interiorly offset from the outer circumference and the inner circumference (nearer the outer circumference to promote better balancing and cushion). The inner volume comprises a radially-circumferential-cavity for holding the cooling medium; the radially-circumferential-cavity is partially filled with the cooling medium such that the cooling medium is substantially self-balancing when in motion. The cooling medium comprises liquid that does not solidify (freeze) below −60 C. The present invention provides traction between the vehicle and the road while providing a flexible cushion that absorbs shock.

The treads may comprise recessed-treads and/or raised-treads and sipes; wherein the raised-treads comprise lugs with an extruded surface area located on the outer circumference whereby ambient air is used to dissipate accumulated heat from friction into an ambient environment providing a cooling means. In preferred embodiments the tire-body comprises styrene-butadiene copolymer; wherein the styrene-butadiene copolymer comprises a tensile strength of about 18 MPa (dependent on use for example less density on sports versions). The non-pneumatic tire and the rim are balanced as the non-pneumatic tire assembly for safe transport of the vehicle between locations, the non-pneumatic tire assembly providing traction between the vehicle and the road surface while providing a flexible cushion that absorbs shock.

The present invention holds significant improvements and serves as non pneumatic (solid rubber) vehicle tires. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, solid rubber vehicle tires, constructed and operative according to the teachings of the present invention.

The various embodiments of the present invention will hereinafter be described in conjunction with the appended drawings, wherein like designations denote like elements.

DETAILED DESCRIPTION

Figure 1:
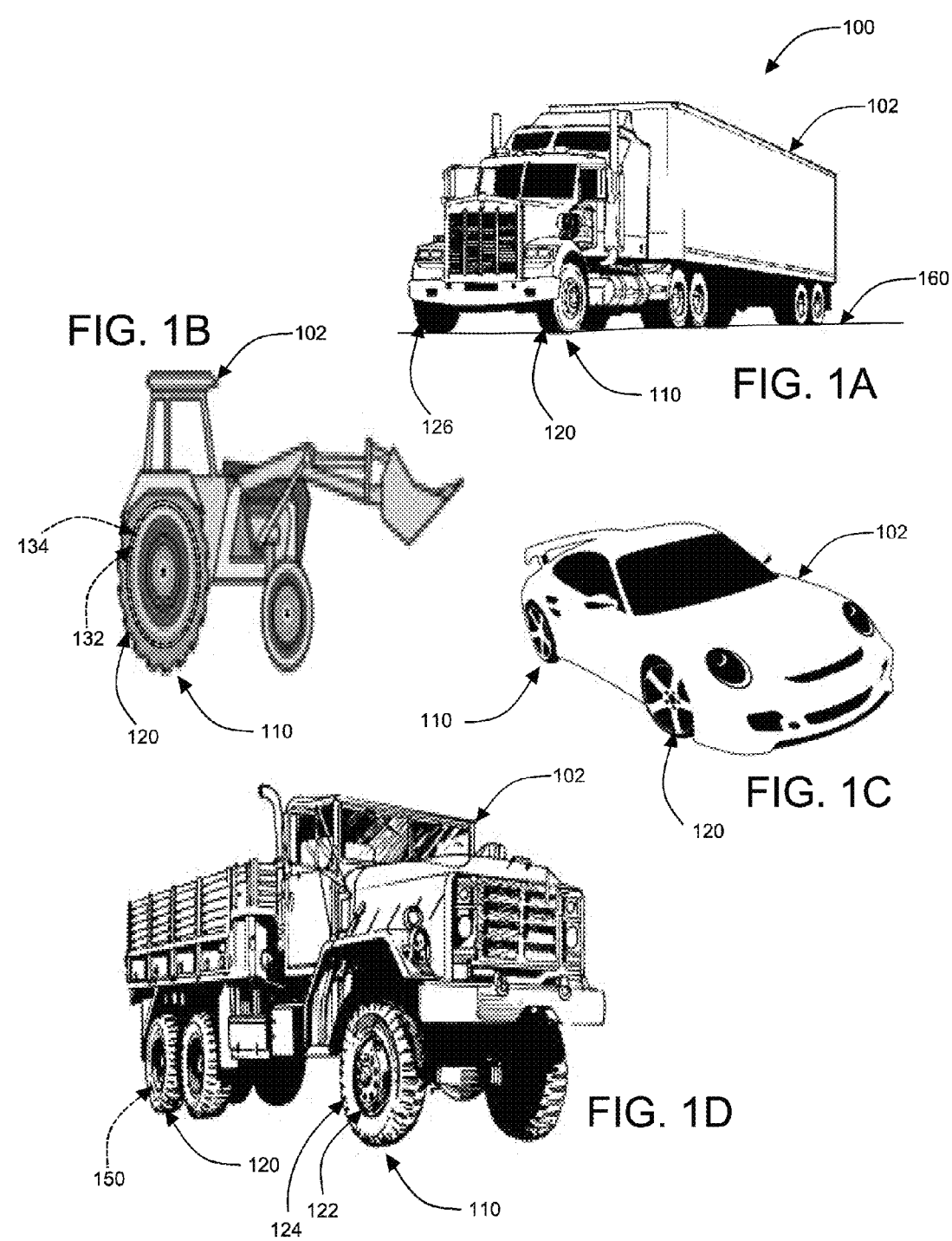
FIG. 1A shows a perspective view illustrating a tractor-trailer using a non-pneumatic tire system according to an embodiment of the present invention.
FIG. 1B shows a perspective view illustrating a tractor using the non-pneumatic tire system according to an embodiment of the present invention.
FIG. 1C shows a perspective view illustrating a sports car using the non-pneumatic tire system according to an embodiment of the present invention.
FIG. 1D shows a perspective view illustrating a large truck using the non-pneumatic tire system according to an embodiment of the present invention.
Figure 2:
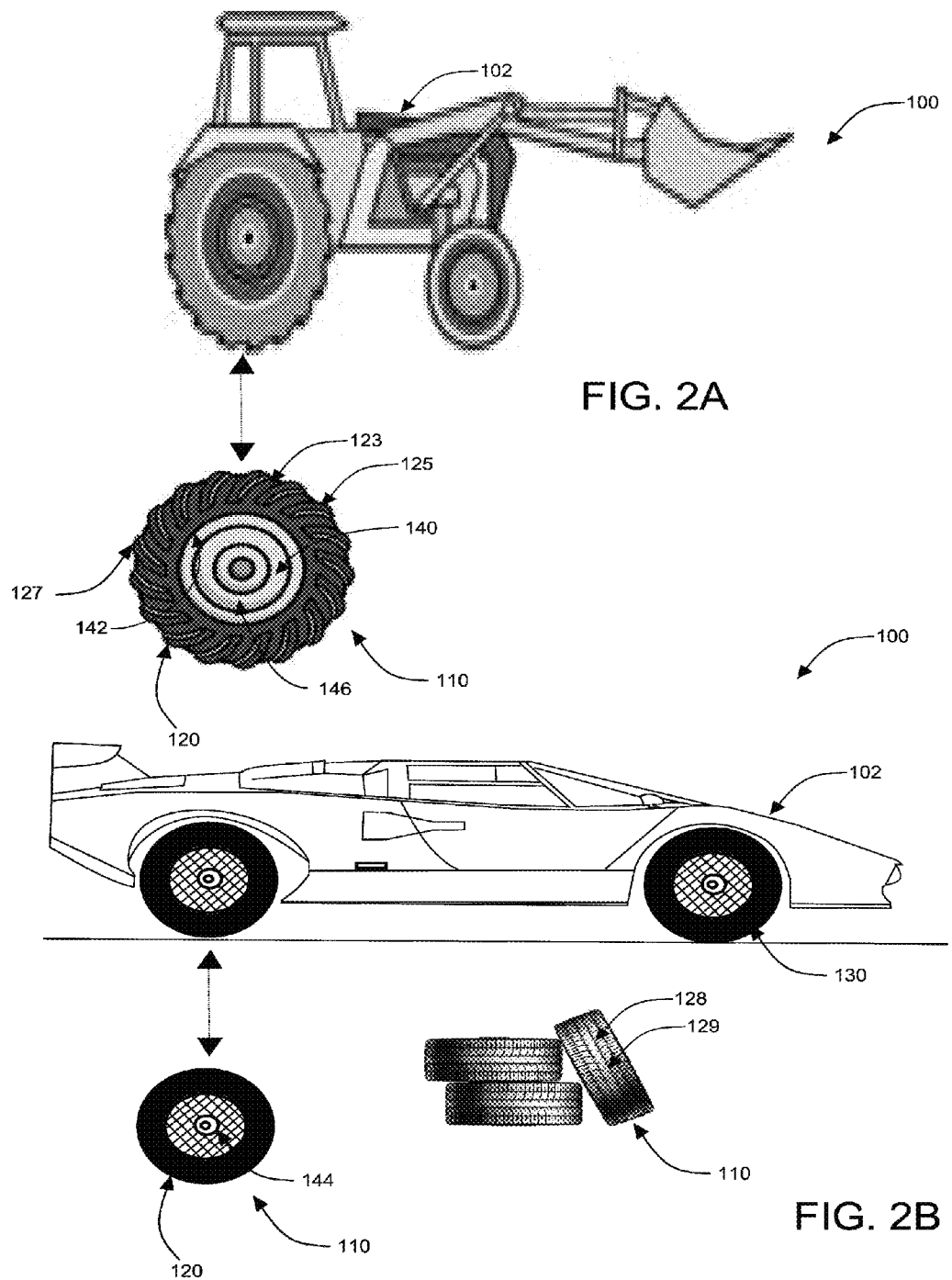
FIG. 2A is a perspective view illustrating the tractor using a removable non-pneumatic tire assembly according to an embodiment of the present invention of FIG. 1B.
FIG. 2B is a perspective view illustrating another sports car using another removable non-pneumatic tire assembly according to an embodiment of the present invention of FIG. 1C.

As discussed above, embodiments of the present invention relate to a non-pneumatic tire and more particularly to solid rubber vehicle tires as used to improve the on-road safety and minimize the environmental footprint caused by conventional tires.

Generally speaking, the purpose, as previously mentioned, is to create vehicle tires with solid materials, such as rubber and polymer, so that the safety of the vehicle is enhanced without the risk of having a flat tire. Today, the majority of tires are pneumatic inflatable structures, comprising a doughnut-shaped body of cords and wires encased in rubber and generally filled with compressed air to form an inflatable cushion. By creating non pneumatic vehicle tires, there is no need to inflate the tire with air, and so there is no risk of having a flat tire.

Both non pneumatic vehicle tires and pneumatic vehicle tires are created with a variety of tread patterns to provide better traction, so that it is safer to drive the vehicle. By creating non pneumatic vehicle tires and pneumatic vehicle tires with depressed and raised tread patterns, the vehicle can achieve optimum handling in adverse weather conditions of rain and snow without the use of chains with the tires. The treads can comprise grooves, lugs, voids and sipes. Grooves run circumferentially around the tire, and are needed to channel away water. Lugs are that portion of the tread design that contacts the road surface. Voids are spaces between lugs that allow the lugs to flex and evacuate water. Tread patterns feature non-symmetrical or non-uniform lug sizes circumferentially to minimize noise levels at discrete frequencies. Sipes are valleys cut across the tire, usually perpendicular to the grooves, which allow the water from the grooves to escape to the sides in an effort to prevent hydroplaning. The vehicle includes cars, bicycles, motorcycles, scooters, trucks, buses, aircrafts, earthmovers, tractors, trailers, heavy equipments, carts, lawnmowers, etc.

At both sides of the non pneumatic vehicle tires, patterns are created to increase the surface area contact of the tires that are in contact with air, so that increased air circulation is enabled to better release the heat build-up when the vehicles are moving. The density of the rubber is created lighter for sports vehicles which require greater maneuverability, and the density of the rubber is higher for heavy duty vehicles such as trucks, tractors, and earthmovers. The patterns can have different shapes and sizes.

At one or both sides of the non pneumatic vehicle tires, patterns can be created with different shapes and sizes. At one or both sides of pneumatic inflatable tires, patterns can also be created with different shapes and sizes. The tread of the non pneumatic vehicle tires, which is the part of the tire that comes in contact with the road surface, can be created with patterns of different shapes and sizes. The tread of pneumatic inflatable tires can also be created with patterns of different shapes and sizes. The patterns can include geometrical shapes and non geometrical shapes, such as the shape(s) of circle, oval, ellipse, curve, wave, spiral, bubble, cone, ring, cross, triangle, square, rectangle, hexagon, octagon, arrow, and so on.

The patterns can also be created as depressed areas or concave areas, and raised areas or convex areas, of different shapes and sizes depending on the desired handling characteristics. The patterns of both depressed areas or concave areas, and raised areas or convex areas, can be created on the same tire. For larger tires, the patterns can have larger shapes and sizes. And for smaller tires, the patterns can have smaller shapes and sizes.

The patterns of passenger vehicle tires can have a size of about 1 to 30 millimeters in depth, in height, in width, and in length. The length of the patterns can be as long as the circumference of the tire. And the patterns can be separated from one another by about 1 to 30 millimeters. The patterns can also include the shapes of letters, alphabets, numbers, symbols, drawings, trademarks, and logos. For example, the company name and logo can be used as patterns. Non pneumatic vehicle tires and pneumatic vehicle tires can also be created without any patterns at both sides of the tires in alternate embodiments.

For example, for passenger vehicles, at both sides of the solid rubber vehicle tires, the patterns can be created as depressed areas of circular shapes with diameter of about 1 to 30 millimeters, and the depression of the circular shapes of about 1 to 30 millimeters, and the circular shapes can be separated from each other by about 1 to 30 millimeters. Another example, for passenger vehicles, at both sides of the solid rubber vehicle tires, the patterns can be created as a number of depressed areas of concentric circles surrounding the wheel of the vehicle, with the depth of the depression of the concentric circles of about 1 to 30 millimeters, and the width of the depression of the concentric circles of about 1 to 30 millimeters, and the concentric circles can be separated from each other by about 1 to 30 millimeters. And another example, for passenger vehicles, the tread can be created as raised areas of round shapes with diameter of about 1 to 30 millimeters, and the raised area of about 1 to 30 millimeters in height, and the round shapes can be separated from each other by about 1 to 30 millimeters. The tread can also include depressed areas of wave patterns on the same tires. The depressed areas can have a depth of about 1 to 30 millimeters, and the wave patterns can have a width of about 1 to 30 millimeters. As such, the tread of the non pneumatic vehicle tires, which is the part of the tire that comes in contact with the road surface, can be created with patterns of different shapes and sizes as determined by how it will function.

The non pneumatic vehicle tires can be created in the same sizes and shapes as the conventional pneumatic tires, such that the vehicle's conventional pneumatic tires can replaced with the non pneumatic vehicle tires. The materials used for non pneumatic vehicle tires include natural rubber, synthetic rubber, plastic, bio-plastic, metal, polymer, etc. The non pneumatic vehicle tires can be created with rubber, or a combination of materials can be used. The non pneumatic vehicle tires can be created completely solid, or sections of intervals can be included inside the tires.

Other components or materials may be added into the tires to cool them, to keep them balanced, to minimize wear and the like. Just like the current pneumatic tires, treading is created for the non pneumatic vehicle tires. As the non pneumatic vehicle tires age with time, the treading wears out, and they will need to be replaced. Vehicle where both non pneumatic vehicle tires and pneumatic vehicle tires with tread patterns may be used include but are not limited to cars, bicycles, motorcycles, scooters, trucks, buses, aircrafts, earthmovers, tractors, trailers, heavy equipments, carts, and lawnmowers. Non pneumatic vehicle tires or solid rubber vehicle tires can include spare tires. Both non pneumatic vehicle tires and pneumatic vehicle tires with tread patterns also include spare tires.

Figure 3:
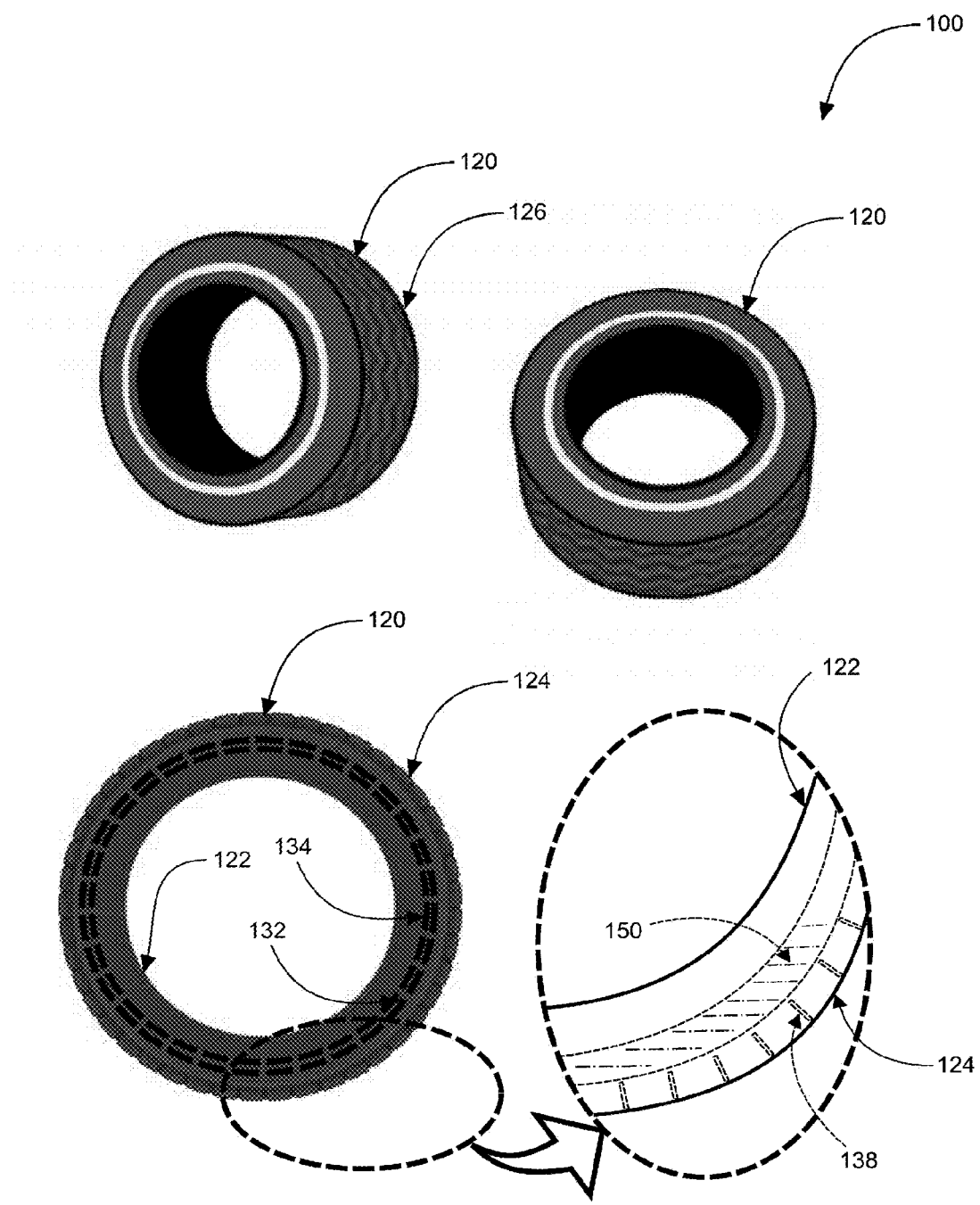
FIG. 3 is a sectional (cut-away) view illustrating the non-pneumatic tire assembly according to an embodiment of the present invention of FIGS. 1A-2B.

Referring to the drawings by numerals of reference there is shown in FIGS. 1A-2B, various views of non-pneumatic tire assembly 110 of non-pneumatic tire system 100 for use with various vehicle(s) 102 according to embodiments of the present invention. FIG. 3 is a sectional (cut-away) view illustrating non-pneumatic tire assembly 110 according to an embodiment of the present invention of FIGS. 1A-2B.

Non-pneumatic tire system 100 for use with vehicle 102 comprises at least one non-pneumatic tire assembly 110 having non-pneumatic tire 120 (with at least inner circumference 122; outer circumference 124; ribs 126; treads 128; and tire-body 130); and rim 140 (having outer periphery 142; inner periphery 144; and rim-body 146). Non-pneumatic tire system 100 for use with vehicle 102 comprises non-pneumatic tire assembly 110; non-pneumatic tire assembly 110 for use on vehicle 102, as shown. Vehicle 102 may comprise various cars, bicycles, motorcycles, scooters, trucks, buses, aircrafts, earthmovers, tractors, trailers, carts, heavy equipment, and lawnmowers. Upon reading this specification, it should be appreciated that, under appropriate circumstances, considering such issues as user preferences, design preference, structural requirements, marketing preferences, cost, available materials, technological advances, etc., other land vehicles may use the present invention, that the above-mentioned list and those shown in FIGS. 1A-2B is not meant to be limiting, but rather is provided as an exemplary means as to how the present invention may be used.

Non-pneumatic tire assembly 110 comprises in combination non-pneumatic tire 120 and rim 140; rim 140 removably mountable to vehicle 102 (as shown in FIGS. 2A-2B) via rim-body 146. Non-pneumatic tire 120 is removably mounted about outer periphery 142 of rim 140.

Parameters of tire-body 130 of non-pneumatic tire 120 are defined by inner circumference 122 and outer circumference 124 oriented (when mounted) substantially parallel to road-engaging surface 126; outer circumference 124 providing road-engaging surface 126 comprises treads 128. Treads 128 are useful for providing positive grip on a road surface 160. Tire-body 130 of non-pneumatic tire 120 comprises a (substantially) solid cross-section (not a shell designed to hold compressed air) defined vertically via exterior walls substantially perpendicular to road-engaging surface 126.

Rim-body 146 of rim 140 is defined by outer periphery 142 and inner periphery 144. Rim 140 may be similar to a conventional rim; however there may be differing features such as specialty balance weight mounts and no aperture is present for a valve stem. Rim-body 146 of rim 140 comprises fastener receivers (holes for allowing wheel studs to pass therethrough) for fastening rim 140 to vehicle 102 in a conventional manner. Non-pneumatic tire 120 and rim 140 are balanced as non-pneumatic tire assembly 110 for safe transport of vehicle 102 between locations. Those with ordinary skill in the art will now appreciate that upon reading this specification and by their understanding the art of tire and rim balancing as described herein, methods of balancing wheel assemblies for safety, handling and maximum longevity in use will be understood by those knowledgeable in such art.

Rim 140 may comprise mounting points and/or pockets or the like to provide sufficient balancing means. Non-pneumatic tire assembly 110 provides traction between vehicle 102 and road surface 160 while providing a flexible cushion (foam or liquid absorbing means) that absorbs shock.

At least one inner volume 132 preferably comprises radially-circumferential-cavity 134 for holding cooling medium 150 (which also serves to absorb road shock to provide a smoother ride and better handling). Radially-circumferential-cavity 134 is (only) partially filled with cooling medium 150 such that cooling medium 150 is substantially self-balancing when in motion. Cooling medium 150 may move (be displaced by loading of vehicle 102 against road surface 160) appropriately to other portions of radially-circumferential-cavity 134 when cornering and the like. Cooling medium 150 provides a much more efficient means of dissipating heat from friction than traditional compressed air.

In alternate embodiments at least one inner volume 132 may comprise matter (solid, liquid, and gas) selected from the group consisting of foam, gel, and air (not shown). Foam, gel, and air may be dispersed throughout tire-body 130 adjacent outer circumference 124 preferably in layers. This embodiment is able to absorb road shock as well.

In preferred embodiments tire-body 130 comprises at least one inner volume 132 for holding a cooling medium 150; inner volume 132 supported by ribs 126. Inner volume 132 may comprise radially-circumferential-cavity 134 in preferred embodiments, or individually isolated enclosed pockets in alternate embodiments. Treads 128 may comprise recessed-treads 129 (grooves or the like); treads 128 may comprise raised-treads 127.

Raised-treads 127 may comprise lugs 125 with an extruded surface area located on outer circumference 124 whereby ambient air is used to dissipate accumulated heat from friction into an ambient environment providing a cooling means, and to increase safety of the vehicle 102 by providing balancing means and better traction to withstand rough weather of rain and snow without the use of chains with the non-pneumatic tire 120. Tire-body 130 may further comprise shoulders 123. Shoulders 123 may comprise lugs 125; lugs 125 able to act as a balancing means and also providing cooling means. Tire-body 130 does not comprise an interior volume for holding compressed air.

In preferred embodiments tire-body 130 comprises styrene-butadiene copolymer; wherein the styrene-butadiene copolymer comprises a tensile strength of at least 18 MPa. The tensile strength may be less than, equal to, or greater than 18 MPa depending on application the present invention is used in.

In alternate embodiments tire-body 130 comprises natural rubber or other suitable equivalent. In these embodiments natural rubber preferably comprises a density of less than 1100 kg/m3 for use with sport vehicle(s) 102, as shown in FIGS. 1C and 2B. In these natural rubber embodiments the rubber comprises a density of more than 1100 kg/m3 for use with non-sport vehicle(s) 102, as shown in FIGS. 1A, 1B, 1D and 2A. Other densities may be used as per vehicular application depending on the desired handling to be achieved. The material of tire body can comprise varying densities on the same tire. The density of the tire body can be evenly distributed. And the densities of the tire body can have varying distributed densities. For passenger vehicles, the outer surface of the tire body in contact with the road can have a lower density than the rest of the tire body. The lower density on the tire surface means that the material is softer, so that the ride of the vehicle is softer. The higher density for the rest of the tire body creates more weight, so that the center of gravity of the vehicle is lowered. For heavy duty vehicles, the outer surface of the tire body in contact with the road can have a higher density than the rest of the tire body. The higher density on the tire surface means that the material is harder, so that the vehicle can withstand rough road conditions. For aircrafts, the outer surface of the tire body in contact with the road can have a higher density than the rest of the tire body, so that the tire is lighter. Those with ordinary skill in the art will now appreciate that upon reading this specification and by their understanding the art of tires, tire features and balancing as described herein, methods of manufacturing the present invention will be understood by those knowledgeable in such art and may include other components and features such as biasing, belting, plies, sipes, wear bars, voids, grooves, and the like.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A non-pneumatic tire system for use with a vehicle comprising:
   a non-pneumatic tire assembly having;
      a non-pneumatic tire having;
         an inner circumference;
         an outer circumference;
         ribs;
         treads; and
      a tire-body;
         a rim having;
            an outer periphery;

an inner periphery; and
a rim-body;
wherein said tire-body comprises at least one inner volume for holding a cooling medium, said at least one inner volume supported by said ribs;
wherein said at least one inner volume comprises matter selected from the group consisting of foam and gel;
wherein said non-pneumatic tire system for use with a vehicle comprises said non-pneumatic tire assembly, said non-pneumatic tire assembly for use on said vehicle;
wherein said non-pneumatic tire assembly comprises in combination said non-pneumatic tire and said rim, said rim removably mountable to said vehicle via said rim-body, said non-pneumatic tire removably mounted about said outer periphery of said rim;
wherein parameters of said tire-body of said non-pneumatic tire are defined by said inner circumference and said outer circumference oriented substantially parallel to a road-engaging surface, said outer circumference providing said road-engaging surface comprising said treads, said treads useful for providing positive grip on a road surface;
wherein said tire-body of said non-pneumatic tire comprises a solid cross-section defined vertically via exterior walls substantially perpendicular to said road-engaging surface;
wherein said rim-body of said rim is defined by said outer periphery and said inner periphery;
wherein said rim-body of said rim comprises fastener receivers for fastening said rim to said vehicle; and
wherein said non-pneumatic tire and said rim are balanced as said non-pneumatic tire assembly for safe transport of said vehicle between locations, said non-pneumatic tire assembly providing traction between said vehicle and said road surface while providing a flexible cushion that absorbs shock.

2. The non-pneumatic tire system for use with a vehicle of claim 1 wherein said at least one inner volume comprises a radially-circumferential-cavity for holding said cooling medium being substantially self-balancing when in motion.

3. The non-pneumatic tire system for use with a vehicle of claim 1 wherein said treads comprise grooves, lugs, voids and sipes.

4. The non-pneumatic tire system for use with a vehicle of claim 1 wherein said treads comprise recessed-treads, with depressed patterns selected from the group consisting of geometrical shapes and non geometrical shapes in varying sizes, including circle, oval, ellipse, curve, wave, spiral, bubble, cone, ring, cross, triangle, square, rectangle, hexagon, octagon, and arrow.

5. The non-pneumatic tire system for use with a vehicle of claim 1 wherein said treads comprise raised-treads, with raised patterns selected from the group consisting of geometrical and non geometrical shapes in varying sizes, including circle, oval, ellipse, curve, wave, spiral, bubble, cone, ring, cross, triangle, square, rectangle, hexagon, octagon, and arrow.

6. The non-pneumatic tire system for use with a vehicle of claim 5 wherein said raised-treads comprise lugs with an extruded surface area located on said outer circumference whereby ambient air is used to dissipate accumulated heat from friction into an ambient environment providing a cooling means, and said raised-treads increase safety of said vehicle by providing balancing means and better traction to withstand rough weather of rain and snow without the use of chains with said non-pneumatic tire system.

7. The non-pneumatic tire system for use with a vehicle of claim 6 wherein said shoulders comprise said lugs, said lugs acting as a balancing means and also providing said cooling means.

8. The non-pneumatic tire system for use with a vehicle of claim 1 wherein said tire-body further comprises shoulders.

9. The non-pneumatic tire system for use with a vehicle of claim 1 wherein said tire-body comprises material selected from the group consisting of styrene-butadiene copolymer, natural rubber, synthetic rubber, plastic, bio-plastic, metal, and polymer.

10. The non-pneumatic tire system for use with a vehicle of claim 9 wherein said styrene-butadiene copolymer comprises a tensile strength of at least 18 MPa.

11. he non-pneumatic tire system for use with a vehicle of claim 9 wherein said natural rubber comprises a density of less than 1100 kg/m3 for use with sport said vehicle(s); and
wherein said natural rubber comprises a density of more than 1100 kg/m3 for use with non-sport said vehicle(s).

12. The non-pneumatic tire system for use with a vehicle of claim 9 wherein said material of said tire body is selected from the group consisting of evenly distributed density, and varying distributed densities, on same non-pneumatic tire.

13. The non-pneumatic tire system for use with a vehicle of claim 1 wherein said non-pneumatic tire comprises depressed patterns selected from the group consisting of geometrical shapes and non geometrical shapes in varying sizes, including circle, oval, ellipse, curve, wave, spiral, bubble, cone, ring, cross, triangle, square, rectangle, hexagon, octagon, and arrow; and
located at one side and both sides of said non-pneumatic tire, in order to increase the surface areas of said non-pneumatic tire that are in contact with air, so that increased air circulation is enabled to better release the heat build-up when said vehicle is moving.

14. The non-pneumatic tire system for use with a vehicle of claim 1 wherein said non-pneumatic tire comprises raised patterns selected from the group consisting of geometrical shapes and non geometrical shapes in varying sizes, including circle, oval, ellipse, curve, wave, spiral, bubble, cone, ring, cross, triangle, square, rectangle, hexagon, octagon, and arrow; and located at one side and both sides of said non-pneumatic tire, in order to increase the surface areas of said non-pneumatic tire that are in contact with air, so that increased air circulation is enabled to better release the heat build-up when said vehicle is moving.

15. The non-pneumatic tire system for use with a vehicle of claim 1 wherein said vehicle is selected from the group consisting of cars, bicycles, motorcycles, scooters, trucks, buses, aircrafts, earthmovers, tractors, trailers, carts, heavy equipments, and lawnmowers.

16. The non-pneumatic tire system for use with a vehicle of claim 1 wherein said non-pneumatic tire comprises spare tire.

* * * * *